A. W. EPRIGHT AND W. H. GRINDALL.
RAILWAY TRACK SCALE.
APPLICATION FILED JUNE 10, 1918.
1,352,441.
Patented Sept. 14, 1920.
6 SHEETS—SHEET 1.
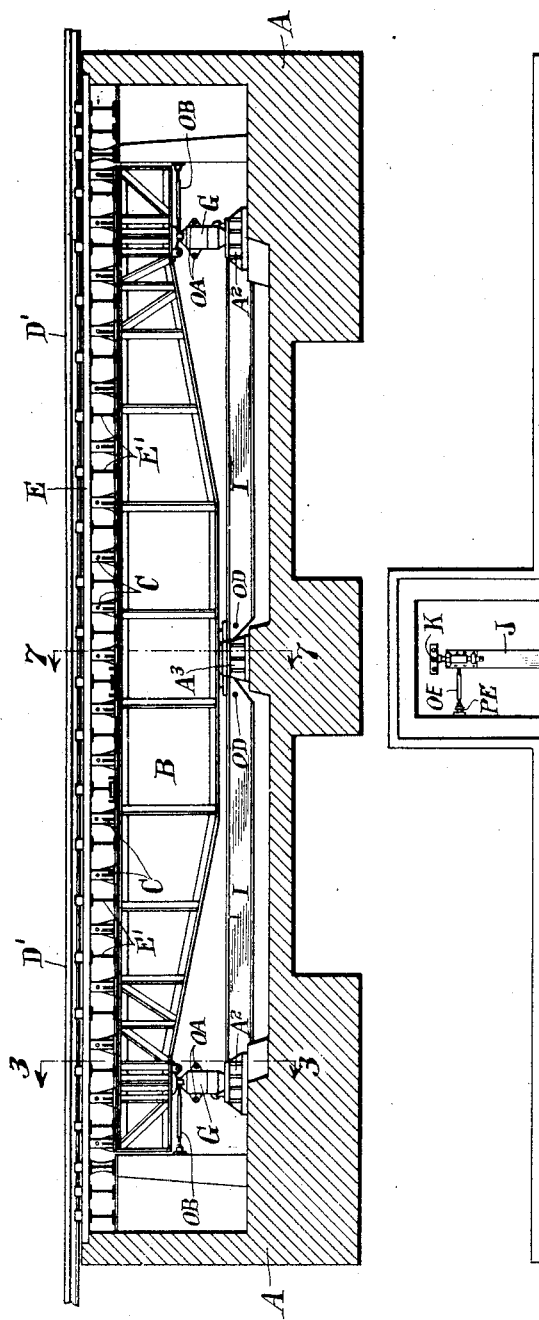
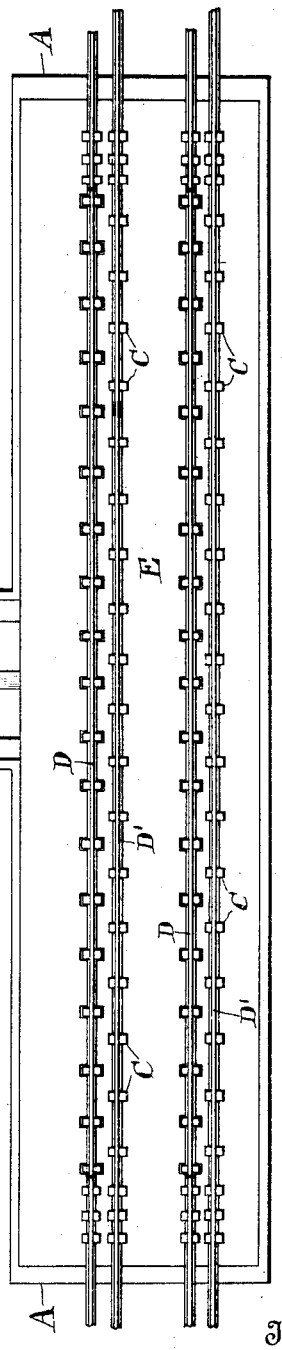

A. W. EPRIGHT AND W. H. GRINDALL.
RAILWAY TRACK SCALE.
APPLICATION FILED JUNE 10, 1918.
1,352,441.
Patented Sept. 14, 1920.
6 SHEETS—SHEET 3.
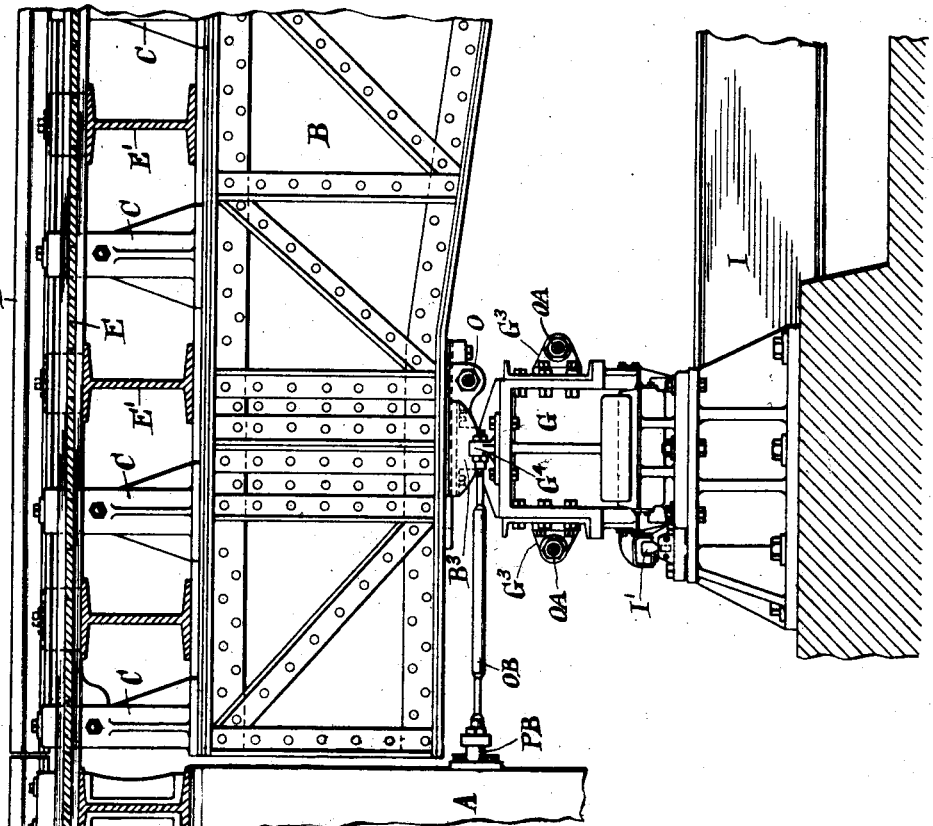
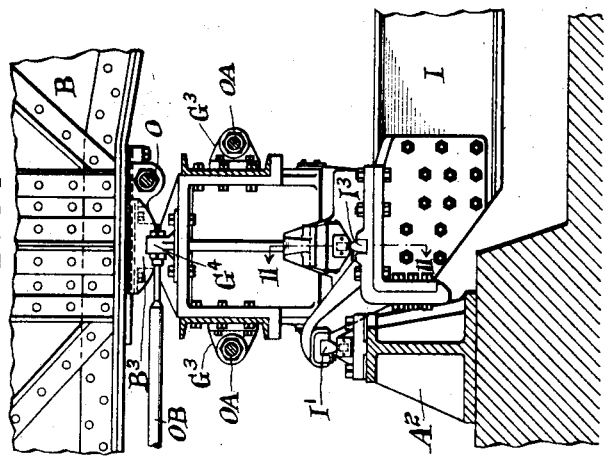
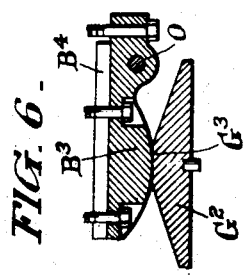
Inventors
Alonzo W. Epright +
William H. Grindall
Chambers + Hubbell
By His Attorneys A. W. EPRIGHT AND W. H. GRINDALL.
RAILWAY TRACK SCALE.
APPLICATION FILED JUNE 10, 1918.
1,352,441.
Patented Sept. 14, 1920.
6 SHEETS—SHEET 4.
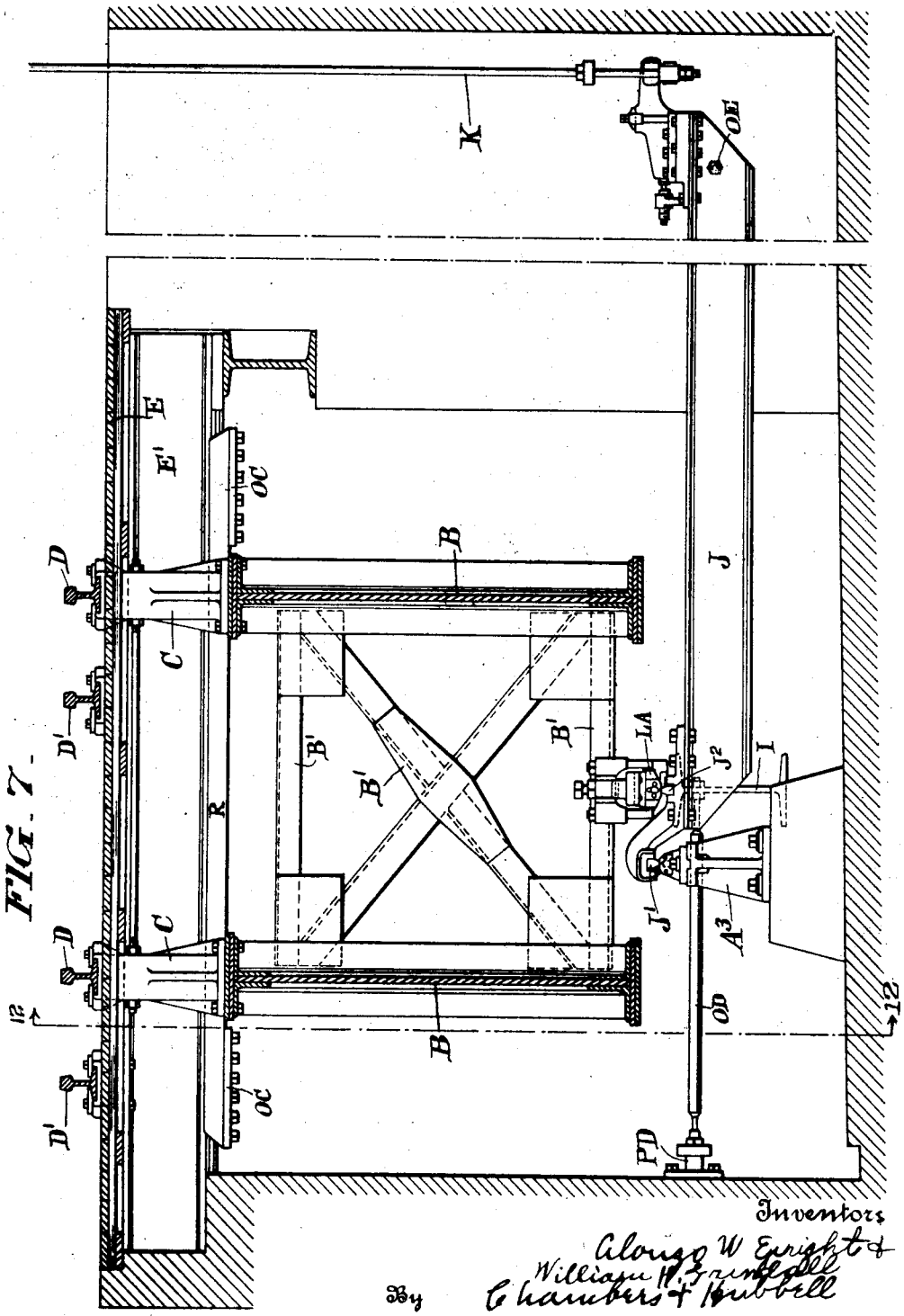

A. W. EPRIGHT AND W. H. GRINDALL.
RAILWAY TRACK SCALE.
APPLICATION FILED JUNE 10, 1918.
1,352,441.
Patented Sept. 14, 1920.
6 SHEETS—SHEET 5.
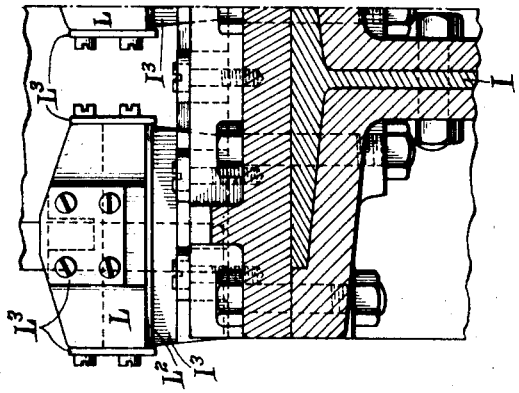
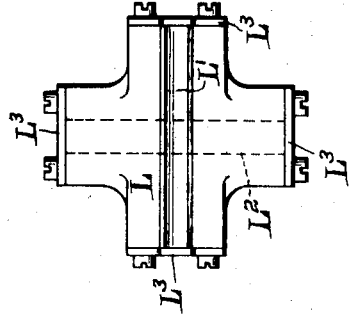
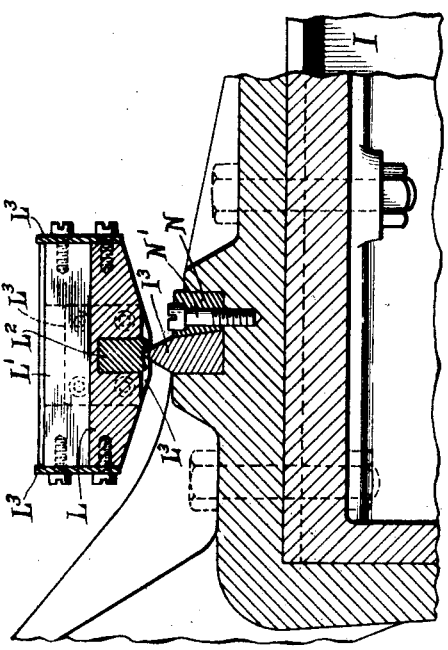
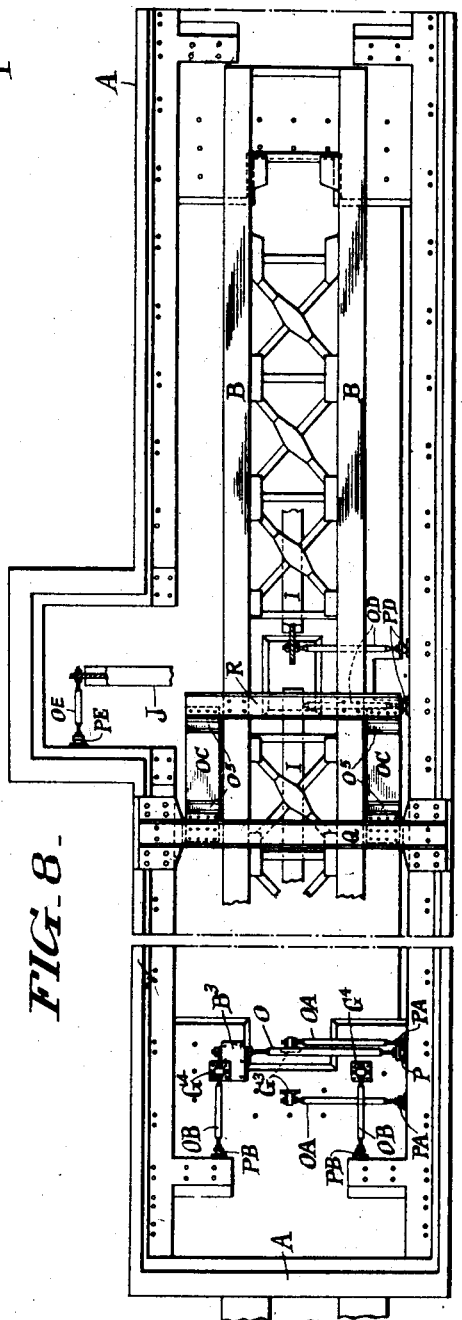
Inventors
George W. Epright +
William H. Grindall
By Chambers + Hubbell
Attorney

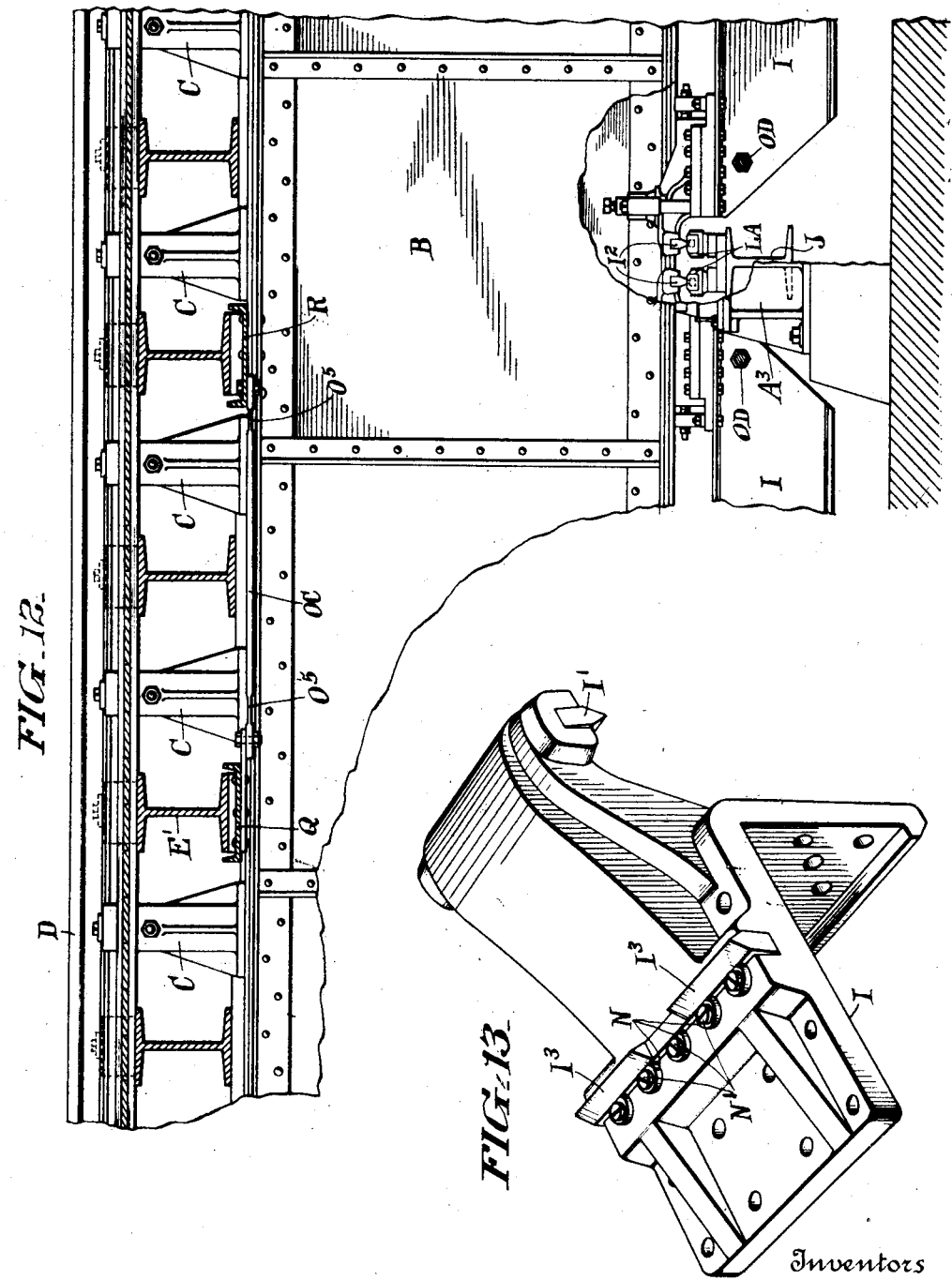

UNITED STATES PATENT OFFICE.

ALONZO W. EPRIGHT AND WILLIAM H. GRINDALL, OF ALTOONA, PENNSYLVANIA.

RAILWAY-TRACK SCALE.

1,352,441.  Specification of Letters Patent.  Patented Sept. 14, 1920.

Application filed June 10, 1918. Serial No. 239,173.

*To all whom it may concern:*

Be it known that we, ALONZO W. EPRIGHT and WILLIAM H. GRINDALL, citizens of the United States of America, and residents of Altoona, in the county of Blair and State of Pennsylvania, have invented a certain new and useful Improvement in Railway-Track Scales, of which the following is a true and exact description, reference being had to the accompanying drawings, which form a part thereof.

Our present invention consists in improvements in railway track scales, and has for its general object the provision of an improved lever scale construction suitable for use in weighing heavy loads, and was especially devised for use as a railway track scale. Specific objects of the invention are to provide a lever scale mechanism of the class referred to, characterized by its general simplicity and by the special provisions made for holding the vertically movable scale parts against undesirable horizontal movements, and by the provisions made for equalizing the transmission of the platform load to the scale levers, and for avoiding errors due to the deflection of the parts, and by the special construction of knife edge bearings suitable for use in a scale of this type.

The various features of novelty which characterize our invention are pointed out with particularity in the claims annexed to and forming a part of this specification. For a better understanding of the invention, however, and the advantages possessed by it, reference should be had to the accompanying drawings and descriptive matter in which we have illustrated and described a preferred embodiment of our invention.

Of the drawings:

Figure 1 is an elevation of a railway track scale with the walls of the scale pit in section.

Fig. 2 is a plan view of the scale shown in Fig. 1.

Fig. 4 is a partial elevation taken similarly to Fig. 1, but on a larger scale.

Fig. 5 is a section taken on the line 5—5 of Fig. 3, with parts broken away and removed.

Fig. 6 is a partial section on the line 6—6 of Fig. 3.

Fig. 7 is a section on the line 7—7 of Fig. 1.

Fig. 8 is a somewhat diagrammatic plan view of the scale with some of the parts removed, illustrating the means for preventing undesirable horizontal movement of the movable parts of the scale.

Fig. 9 is a partial section on the line 9—9 of Fig. 3.

Fig. 10 is a plan view of one of the parts shown in section in Fig. 9.

Fig. 11 is a section on the line 11—11 of Fig. 5.

Fig. 12 is a view taken similarly to Fig. 1, but on a larger scale and showing a central portion only of the scale mechanism, and Fig. 13 is a perspective view of one of the knife edge pivot holding portions of the scale.

Figure 3:
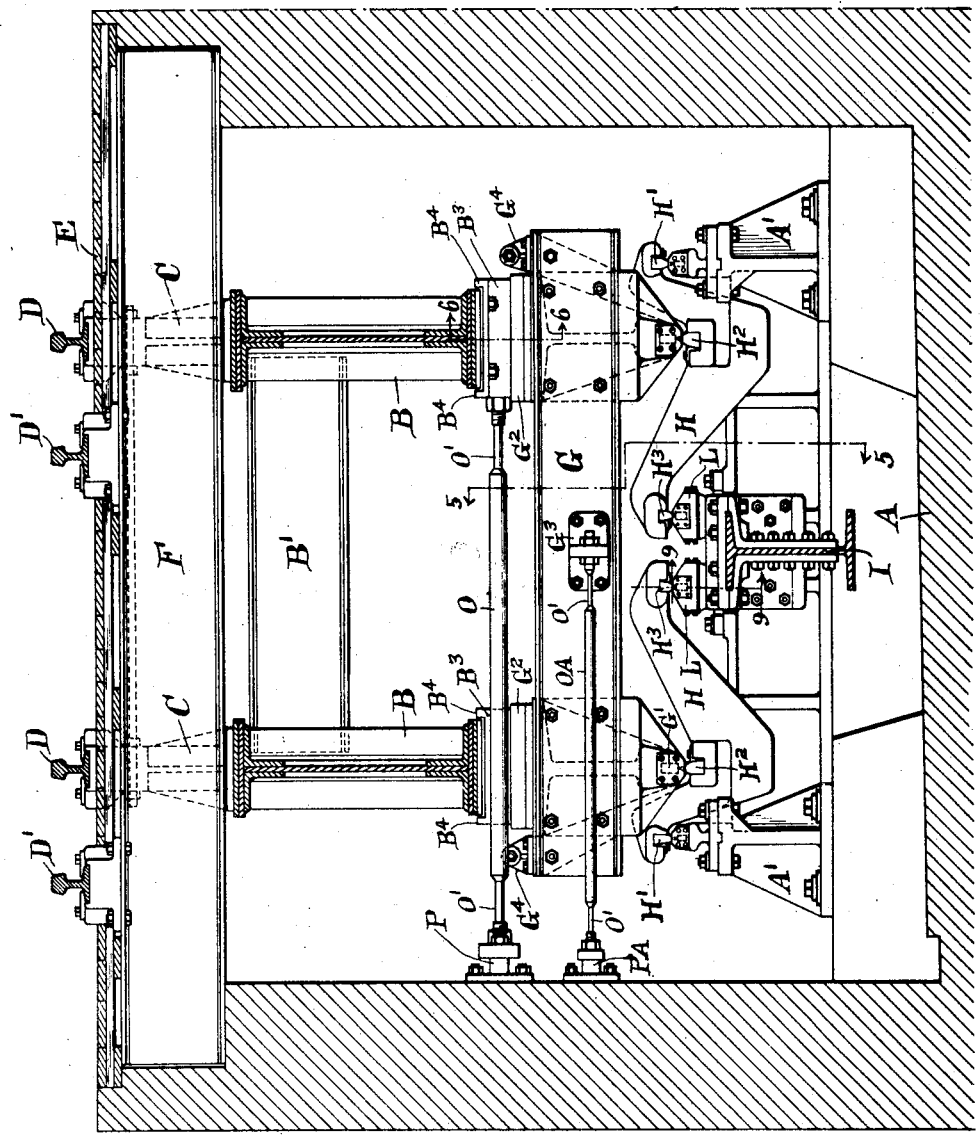
Fig. 3 is a section on the line 3—3 of Fig. 1.

In the railway track scale shown in the drawings, A represents the masonry wall of the scale pit, and B represents the longitudinal beams of the scale bridge or platform frame. The longitudinal beams B are connected by cross braces B'. The scale track rails D are arranged above the longitudinal beams B and are carried by the latter through chairs or posts C, which project through the roof E of the scale pit. This roof is mounted on transverse stationary beams E', which also support the usual shunt rails D' for passing a train not to be weighed. The weight of the platform and its load is transmitted from the longitudinal beams B to transverse beams G at the ends of the scale. The transverse beams G are carried through knife edge bearings by main levers H, which are fulcrumed through knife edge pivots H' on pedestals A' resting on the bottom wall of the scale pit. At their inner ends the main levers H are supported through knife edge pivots H³ and equalizers L, by the longitudinal levers I. The longitudinal levers I, of which there are two, extend in opposite directions from the center of the scale, and are each fulcrumed at its outer end by means of a knife edge pivot I' resting on a bearing block carried by the pedestal A², and at its inner end each lever I is provided with a knife edge pivot I², through which, and a corresponding equalizer LA, the inner end of each lever I is pivotally connected, as hereinafter described, to the transverse scale beam lever J. The latter (see Fig. 7) has at its inner end a knife edge pivot J', which bears against a bearing block carried by the pedestal A³, and at its lower outer end, is connected in the usual manner to the vertical scale rod K. The upper end of the rod K may be connected in the usual manner to a scale beam (not shown).

The equalizer LA is identical in form with the equalizers L, the construction of the latter being shown in detail in Figs. 9, 10 and 11. As shown, each of these equalizers comprises a suitably shaped block or body formed with a groove in its upper side receiving a knife edge pivot fulcrum block $L'$, and is provided at its under side with a groove or channel, receiving a knife edged pivot fulcrum block $L^2$. The two fulcrum blocks $L'$ and $L^2$ are each held in place by end plates $L^3$ detachably connected to the equalizer body by screws. The two fulcrum blocks $L'$ and $L^2$ of each equalizing member extend transversely to one another. The knife edge pivots $H^3$ at the inner ends of the main levers H bear against the upper fulcrum blocks $L'$ of the two equalizing members L, while the lower fulcrum blocks $L^2$ of the equalizing members rest upon the knife edge pivot $I^3$ carried by the corresponding longitudinal lever I. As shown in Fig. 13 each pivot $I^3$ is formed of two alined knife edges extending up from a solid common base. Similarly the upper fulcrum block of each equalizing member LA supports the knife edge pivot $I^2$ carried by the inner end of each longitudinal lever I, and the transverse lower fulcrum block of each equalizing member LA, rests upon the knife edge pivot $J^2$ carried by the beam lever J. The use of the equalizing members L and LA at the places at which they are located avoids inaccuracies and inequalities in the distribution of the pressure between each of the corresponding knife edge pivots and its fulcrum block which would otherwise result from deflections of the corresponding scale lever tending to disturb the angular relation between planes including the knife edge pivot $H^3$ and the knife edge pivot $I^3$.

As shown best by Figs. 9 and 13, each section of the knife edge pivot $I^3$ is in the form of a bar, the body portion of which is slightly tapered, being widest at its edge remote from the pivot edge proper, and is loosely received in a channel in a reinforcing end portion of the corresponding lever I of slightly greater width than the knife edge pivot bar, and is secured in place by means of a plurality of wedge fastening blocks N, which are secured to the body of the lever I by bolts $N'$. As shown, each block N is in the form of a cylindrical bushing, having one side beveled off to fit the level of the adjacent side of the knife edge pivot. Each block N is received in a cylindrical recess formed in the lever I, and is separately and adjustably held in place by a corresponding bolt $N'$. With this construction the knife edge pivot is very securely anchored in place, and at the same time may be removed and replaced when necessary. The securing means employed has the advantage also that the knife edge pivot bar itself, the wedge blocks and the recesses in which the pivot and wedge blocks are received may be readily formed with a high degree of accuracy. Preferably, as shown, each of the various knife edge pivots employed in the scale, are formed, and held in place in the manner illustrated in Figs. 9 and 13.

The transverse beams at each end of the scale are each provided with a knife edge pivot bearing $G'$ at each end, which rests upon the knife edge pivot $H^2$, carried by the corresponding main lever H. We do not rigidly connect the beams B to the transverse beams G, but interpose sliding and rocking bearings between the longitudinal beams B and the transverse beams G. One of these bearings is illustrated in Fig. 6. As shown, it comprises a bearing block $G^2$ which is doweled, or otherwise suitably secured, to the upper side of the transverse beam G on which it rests, and is provided at its upper side with a flat bearing surface $G^3$. Resting on the flat surface $G^3$ is the convex underside of a bearing member $B^3$ secured to the corresponding longitudinal beam B. As shown, the bearing member $B^3$ is provided with flanges $B^4$ at its opposite sides, and between which is received the base of the corresponding beam B. The upper member $B^3$, shown in Fig. 6, and employed at the right hand side of Fig. 3 differs from the bearing block $B^{30}$, secured to the left hand beam B, as shown in Fig. 3, only in that the bearing member $B^3$ does, while the bearing member $B^{30}$ does not, have provisions for securing to it a stay or positioning device O hereinafter described. We thus avoid any inequality in the contact pressure between each knife edge pivot $H^2$ and the corresponding bearing members $G'$ along the length of the pivot, resulting from the deflections of the beams B occurring with varying platform loads.

The stay O is in the form of a metal rod having one end threaded and passing through a hole formed for the purpose in the bearing block $B^3$ and rigidly secured to the latter by nuts $O^2$. The other end of the stay is rigidly secured to the wall of the scale pit by means of a bracket or connecting member P. The bar O is formed adjacent its ends with portions $O'$, of reduced diameter, to give the bar the desired transverse flexibility. There is one of these bars O at each end of the scale and their function is to serve both as tension devices and as struts to prevent displacement of the beams B in a horizontal direction transverse to the length of the beams. The transverse beams G are held against horizontal movement in the direction of the length of these beams by stays or positioning devices OA similar to the stay O, each of the stays OA being formed with end portions of reduced diameter. Each stay OA is secured at one end to the wall of the scale pit through a corresponding bracket member PA, and has its other end secured to a bracket $H^3$ carried by the corresponding beam G. As shown, there are two stays OA for each beam G, these being connected to bracket $B^3$ secured to the opposite sides of the beam. Displacement of each beam G in a horizontal direction transverse to the length of the beam is prevented by stays OB similar to stays O in form, and each having one end secured to the wall of the scale pit through a corresponding bracket or connecting device PB, and having its opposite end rigidly secured to a bracket $G^4$ bolted to the upper side of the beam G, there being a stay OB and bracket $G^4$ at each end of each beam G.

Undesirable horizontal displacement of the scale platform proper is prevented by means of transversely flexible stays OC, which are shown, as extending parallel to the platform beams B, and each having one end anchored to the wall of the scale pit, and having its other end secured to the scale platform. As shown, one end of each stay OC is secured to a channel bar Q, which is anchored to the scale pit wall, while the other end of the stay is secured to a channel bar R bolted to the upper sides of the platform beams B. Advantageously the channel bar R is connected to the beams B about midway between the ends of the latter. By connecting stays OC to the platform at the center of the latter we minimize the disturbing effect which the thermal expansion and contraction of the platform in the direction of the length of the beams B tends to produce. The stays OC may be in the form of rods having ends of reduced cross section, but preferably, as shown, we form these stays of metal plates having end portions $O^5$ reduced in thickness to give the desired transverse flexibility.

Each longitudinal lever I is connected at its inner end to the wall of the scale pit by a stay OD similar in form to the stay O, and secured to the wall of the scale pit through a bracket or connecting device PD. Advantageously also the outer end of the beam lever J is connected to the wall of the scale pit by a stay OE similar to the stay O, and having one end rigidly connected to the wall of the scale pit through a bracket or connecting device PE.

The stay means described for preventing displacement of the scale parts in a horizontal direction, form highly satisfactory means for the purpose for which they are employed. In assembling and calibrating the scale it is easy to make such relative adjustments of the effective lengths of the stays as may be desirable. In a scale of the type illustrated, while the stay members described form practically rigid connections between the scale parts and the wall of the scale pit, so far as movements in a horizontal direction are concerned, they possess all the necessary transverse flexibility to accommodate the necessary vertical movements of the scale parts, and conduce to a high degree of accuracy in the operation of the scale as a whole.

While in accordance with the provisions of the statutes we have illustrated and described the best form of our invention now known to us, it will be apparent to those skilled in the art that changes may be made in the form of our invention without departing from its spirit, and that some features of our invention may sometimes be used to advantage without a corresponding use of other features.

Having now described our invention, what we claim as new and desire to secure by Letters Patent, is:

1. In a railway track scale the combination with the scale platform and its supporting levers, of means for preventing horizontal displacement of the platform comprising a horizontal metal plate parallel in length to the scale platform, and having one end fixed and having its opposite end rigidly connected to the scale platform approximately midway between the longitudinal ends of the latter.

2. In a railway track scale the combination with the scale platform and its supporting levers, of means for preventing horizontal displacement of the platform comprising a transverse beam anchored in the side walls of the pit and extending across it intermediate the ends of the platform, a horizontal metal plate parallel in length to the scale platform, and having one end fixed to said transverse beam and having its opposite end rigidly connected to the scale platform approximately midway between the longitudinal ends of the latter.

3. In a scale of the type specified the combination with the scale platform, of means for preventing horizontal displacement of the platform in the direction of its length, comprising a stay having one end fixed and having its other end connected to the platform approximately midway between the longitudinal ends of the latter.

4. In a scale of the type specified the combination with the scale platform, of means for preventing horizontal displacement of the platform in the direction of its length, comprising a transverse beam anchored in the walls of the pit and extending across it intermediate the ends of the platform, a stay having one end fixed to said transverse beam and having its other end connected to the platform approximately midway between the longitudinal ends of the latter.

5. In a scale of the type specified comprising a platform, and a lever supporting system therefor, the combination of transverse beams interposed between the scale platform at each end of the latter and the lever system, and sliding and rocking bearings between said beams and platform.

6. In a lever scale of the type specified, the combination with the scale platform and the supporting levers therefor of beams interposed between the levers and the platform, but not secured to the latter, and separate means for restricting horizontal displacement of the platform and beams.

7. In a lever scale of the type specified, the combination of a scale platform comprising main longitudinal beams, transverse beams on which the ends of the main beams have a movable bearing, a lever system supporting the transverse beams and thereby the platform, and separate means for restricting the horizontal displacement of the transverse beams and the platform.

8. In a lever scale of the type specified, the combination with the platform and supporting levers, of transverse beams interposed between the levers and platform, and bearings between the beams and platform, said bearings being self adjusting to compensate for the expansion and deflection of the platform.

9. In a lever scale of the type specified, the combination with the scale platform and its supporting levers, of transverse beams interposed between the platform, and levers and bearings between the transverse beams and platform, each bearing comprising a cooperating pair of bearing members having their contacting surfaces one flat and the other convex.

10. In a lever scale of the type specified, the combination with the scale platform and its supporting levers, of transverse beams interposed between the platform, and levers, and means for preventing the horizontal displacement of the transverse beams, bearings between the transverse beams and platform, each bearing comprising a coöperating pair of bearing members having their contacting surfaces one flat and the other convex.

11. In a lever scale a knife edge pivot bearing comprising a knife edge pivot member in the form of a bar, and a holder for the bar formed with a channel receiving the bar and larger in width than the bar, and formed with sockets at one side of the channel, and adjustable clamping parts mounted in said sockets, said clamping parts and bar having wedge contact surfaces whereby when said parts are forced into said sockets, said bar is clamped between said parts and the opposite side of said channel, and means for forcing said parts into said sockets.

ALONZO W. EPRIGHT.
WILLIAM H. GRINDALL